US009580621B2

(12) United States Patent
Nebioglu et al.

(10) Patent No.: US 9,580,621 B2
(45) Date of Patent: Feb. 28, 2017

(54) HIGH TEMPERATURE RESISTANCE, RADIATION CURABLE MASKANT FOR METAL SUBSTRATES

(71) Applicants: Ahmet Nebioglu, Winsted, CT (US); Michael A. Morin, Bristol, CT (US); Christopher Alan Cayer, Bristol, CT (US); Marufur Rahim, Avon, CT (US)

(72) Inventors: Ahmet Nebioglu, Winsted, CT (US); Michael A. Morin, Bristol, CT (US); Christopher Alan Cayer, Bristol, CT (US); Marufur Rahim, Avon, CT (US)

(73) Assignee: Dymax Corporation, Torrington, CT (US)

( * ) Notice: Subject to any disclaimer, the term of this patent is extended or adjusted under 35 U.S.C. 154(b) by 520 days.

(21) Appl. No.: 14/021,388

(22) Filed: Sep. 9, 2013

(65) Prior Publication Data
US 2015/0072083 A1 Mar. 12, 2015

(51) Int. Cl.
C08F 2/38 (2006.01)
C09D 169/00 (2006.01)
(Continued)

(52) U.S. Cl.
CPC ........... *C09D 169/00* (2013.01); *C08G 18/00* (2013.01); *C08G 18/44* (2013.01); *C08G 18/672* (2013.01);
(Continued)

(58) Field of Classification Search
CPC .. C09D 169/00; C09D 169/005; C09D 5/008; C09D 5/20; C09D 175/04;
(Continued)

(56) References Cited

U.S. PATENT DOCUMENTS 4,264,752 A 4/1981 Watson, Jr.
5,143,997 A 9/1992 Endo et al.
(Continued)

FOREIGN PATENT DOCUMENTS

EP 0 143 228 A1 5/1985
WO WO9957733 A1 11/1999
(Continued)

OTHER PUBLICATIONS

Corresponding European Search Report EP14182406.0.
Corresponding European Written Opinion EP14182406.0.

Primary Examiner — Robert S Walters, Jr.
(74) Attorney, Agent, or Firm — Roberts & Roberts, LLP

(57) ABSTRACT

A method for shielding a metal substrate surface during the application of heat to the surroundings of the substrate which comprises. A liquid maskant composition is formed which comprises: a) at least one of a polycarbonate urethane diacrylate oligomer, a polycarbonate urethane dimethacrylate oligomer, a polycarbonate caprolactone urethane diacrylate oligomer, or a polycarbonate caprolactone urethane dimethacrylate oligomer; b) a reactive diluent capable of free radical polymerization; and c) a photoinitiator capable of generating free radicals when exposed to actinic radiation. The maskant composition is applied onto a surface of the substrate. The maskant composition is then exposed to sufficient actinic radiation to polymerize or crosslink the composition into a dried maskant. In use the dried maskant is heated on the substrate to a temperature of from about 400° F. to about 600° F. for from about 20 minutes to about 30 minutes, and then the maskant is removed.

17 Claims, 1 Drawing Sheet

(51) Int. Cl.
*C09D 5/00* (2006.01)
*C09D 5/20* (2006.01)
*C08G 64/00* (2006.01)
*C08G 18/00* (2006.01)
*C09D 175/04* (2006.01)
*C08G 18/67* (2006.01)
*C09D 175/16* (2006.01)
*C08G 18/44* (2006.01)

(52) U.S. Cl.
CPC .............. *C08G 64/00* (2013.01); *C09D 5/008* (2013.01); *C09D 5/20* (2013.01); *C09D 169/005* (2013.01); *C09D 175/04* (2013.01); *C09D 175/16* (2013.01); *C23C 4/01* (2016.01)

(58) Field of Classification Search
CPC ...... C09D 175/16; C08G 64/00; C08G 18/00; C08G 18/44; C08G 18/672; C08G 18/42; C23C 4/005; C23C 4/01

USPC .................................................. 427/510, 518
See application file for complete search history.

(56) References Cited

U.S. PATENT DOCUMENTS

| | | | |
|---|---|---|---|
| 5,420,171 | A | 5/1995 | Unruh |
| 5,508,097 | A | 4/1996 | Hauser et al. |
| 6,451,958 | B1 * | 9/2002 | Fan ...................... C08G 18/672 428/411.1 |
| 6,469,071 | B1 | 10/2002 | Fan et al. |
| 6,951,623 | B2 | 10/2005 | Wu |
| 7,763,326 | B2 | 7/2010 | Minor et al. |
| 2002/0032251 | A1 | 3/2002 | Ha |

FOREIGN PATENT DOCUMENTS

| | | |
|---|---|---|
| WO | WO9963017 A1 | 12/1999 |
| WO | WO0250186 A1 | 6/2002 |

* cited by examiner

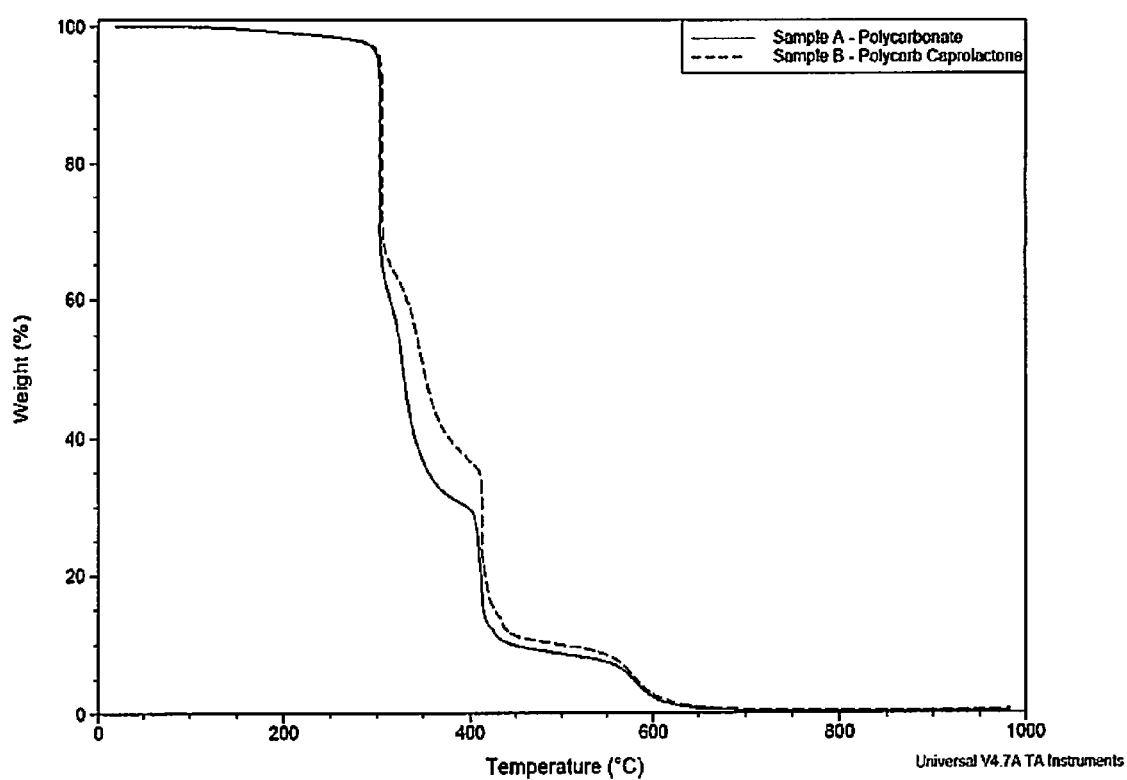

HIGH TEMPERATURE RESISTANCE, RADIATION CURABLE MASKANT FOR METAL SUBSTRATES

BACKGROUND OF THE INVENTION

Technical Field

This invention relates to temporary maskants curable by actinic radiation for use in protecting metal substrates during grit blasting and plasma spray processing. The invention relates to a formulation capable of polymerization through exposure to actinic radiation that can be used to protect a metal substrate from high temperature and abrasive processing. These find use in the manufacture of such products as turbine blades, engine parts, circuit boards, one glass solution (OGS) and orthopedic replacement joints.

Description of the Related Art

The use of temporary radiation-curable masks in the processing of metal surfaces is well known. In many masking applications, two-part, solvent based or thermally cured maskants are impractical and uneconomical. Radiation curable masks can be applied easily and cured quickly using actinic radiation. U.S. Pat. No. 7,763,326 describes the process of applying and curing such a maskant in order to protect a metal surface during diffusion coating. These maskants provide sufficient protection of metal surfaces from processing such as anodizing, plating, and grit blasting, but cannot withstand the high temperatures of plasma spraying for extended periods of time. Current products use polymers having polyether, polyester or polybutadiene backbones which begin to deteriorate at high temperatures causing films to delaminate, blister, and break down.

U.S. Pat. No. 6,951,623 describes a method of protecting metal substrates from chemical exposure using a UV curable maskant. U.S. Pat. No. 5,420,171 is based on a maskant for protecting surface during soldering processes. The maskant is within a temperature of 510° F. for two second during soldering processing and then the film is removed by dissolving in water at a temperature of 120°-140° F. One must use a high temperature resistant tape in order to protect metal surfaces from processing at temperatures produced by plasma spray. Such a tape is described in U.S. Pat. No. 5,508,097. This taping process is manual and may take several hours to complete for each separate part. Tape delaminates during processes such as shot peening or grit blasting. This invention provides a maskant product that can be utilized to protect a metal substrate from both grit blasting and plasma spraying. The composition can be applied and cured within minutes, increasing efficiency and throughput. The mask can then be removed by either peeling or burning off at temperatures greater than 600° F. without leaving any substantial amount of residue. The invention provides a temporary maskant composition that includes a) a urethane (meth)acrylate oligomer having a polycarbonate or polycarbonate caprolactone backbone; b) a reactive diluent monomer capable of polymerization; c) a photoinitiator; d) an optional thickener and e) other optional additives. These compositions are applied to a surface that is to be protected, for example, a surface that has to be protected from grit blasting and/or plasma spray. Thereafter, these compositions are cured by exposing them to actinic radiation. These maskants find use as surface protectants in industrial processes such as acid stripping, anodizing, plating, chemical milling, grit blasting, shot peening, vibratory finishing, air plasma spraying, painting and powder coating. However, they find most particular use in protecting metal surfaces from high temperature treatments for extended periods of time while retaining their removability. The maskant must then be able to withstand temperatures of up to about 600° F. for up to about 30 minutes without delaminating from the metal substrate and still retain enough flexibility and tensile strength such that it would be peelable for removal. After processing, the maskant can be removed by peeling or burning off at temperatures greater than 600° F.

BRIEF DESCRIPTION OF THE FIGURE

FIG. 1 shows a graph of the weight change of the inventive Samples A and B produced according to the example, when heated to 1,000° C.

SUMMARY OF THE INVENTION

The invention provides a method for shielding a metal substrate surface during the application of heat to the surroundings of the substrate which comprises:

I) providing a liquid maskant composition which comprises:

a) at least one of a polycarbonate urethane diacrylate oligomer, a polycarbonate urethane dimethacrylate oligomer, a polycarbonate caprolactone urethane diacrylate oligomer, or a polycarbonate caprolactone urethane dimethacrylate oligomer;

b) a reactive diluent capable of free radical polymerization;

c) a photoinitiator capable of generating free radicals when exposed to actinic radiation;

II) applying the liquid maskant composition onto a surface of the substrate;

III) exposing said liquid maskant composition to sufficient actinic radiation to polymerize or crosslink the composition into a dried maskant.

The invention also provides a liquid maskant composition which comprises a) at least one of a polycarbonate urethane diacrylate oligomer, a polycarbonate urethane dimethacrylate oligomer, a polycarbonate caprolactone urethane diacrylate oligomer, or a polycarbonate caprolactone urethane dimethacrylate oligomer;

b) a reactive diluent capable of free radical polymerization;

c) a photoinitiator capable of generating free radicals when exposed to actinic radiation.

DESCRIPTION OF THE INVENTION

Generally, the composition of the liquid maskant composition comprises a urethane (meth)acrylate oligomer, a polymerizable diluent, a photoinitiator, an optional thickening agent, and optional other additives. Examples of suitable polycarbonate urethane diacrylate oligomers and polycarbonate urethane dimethacrylate oligomers have the formula:

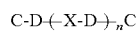

wherein:

n=1-30

D=a diisocyanate residue

C=a residue of a hydroxy functional methacrylate or hydroxy functional acrylate capping agent X=a residue of a polycarbonate diol with formula

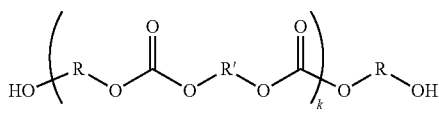

k=1-30
R=$C_2$ to $C_8$ alkyl group;
R'=$C_2$ to $C_8$ alkyl group.

Examples of suitable polycarbonate caprolactone urethane diacrylate oligomers or polycarbonate caprolactone urethane dimethacrylate oligomers have a formula:

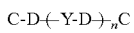

wherein:
n=1-30
D=a diisocyanate
C=a residue of a hydroxy functional methacrylate or hydroxy functional acrylate capping agent
Y=a residue of a polycarbonate caprolactone diol with formula Examples of suitable polycarbonate caprolactone urethane diacrylate oligomer, or a polycarbonate caprolactone urethane dimethacrylate oligomers have the formula

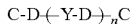

wherein:
n=1-30
D=a diisocyanate
C=a residue of a hydroxy functional methacrylate or hydroxy functional acrylate capping agent
Y=a residue of a polycarbonate caprolactone diol with formula

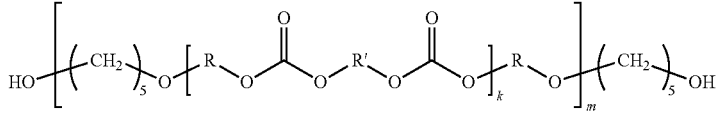

k=1-30
m=1-20
R=$C_2$ to $C_8$ alkyl group;
R'=$C_2$ to $C_8$ alkyl group.

In a preferred embodiment in each of the above formulas, k ranges from about 3 to about 20, more preferably from about 5 to about 15. In a preferred embodiment in each of the above formulas, n ranges from about 2 to about 15, more preferably from about 3 to about 10. In a preferred embodiment in each of the above formulas, m ranges from about 2 to about 15, more preferably from about 3 to about 10. The polyurethane (meth)acrylate oligomer is the reaction product of a polycarbonate polyol or polycarbonate caprolactone polyol containing two or more hydroxyl groups; an aliphatic diisocyanate with a molecular weight of from about 200 to about 500 such that there is an equivalent weight ratio of isocyanate to polyol of from about 1.5-2.5 to about 1.0. The reaction is terminated using a saturated and/or unsaturated mono-functional alcohol with a molecular weight of from about 40 to about 500.

Non-exclusive examples of suitable polycarbonate polyols are reaction products of diols such as ethylene glycol, propylene glycol, 1,3-propanediol, 1,3-butanediol, 1,4-butanediol, 1,5-pentanediol, 1,6 hexanediol, neopentyl glycol, 2-methyl-1,3-pentanediol, 1-methyl-1,5-pentanediol, 2-methyl-1,5-pentanediol and 3-methyl-1,5-pentanediol or mixtures thereof with phosgene or dialkylcarbonates or diarylcarbonates or cyclic carbonates. Typical molecular weight of the polycarbonate polyols used in the present invention are from about 300 to about Daltons, and preferably from about 1000 to about 3000 Daltons.

Non-exclusive examples of suitable polycarbonate caprolactone polyols are the reaction products of the polycarbonate polyols mentioned above and 2-oxepanone. Typical molecular weight of the polycarbonate caprolactone polyols used in the present invention are from about 500 to about 5000 Daltons and preferably from about 1000 to about 3000 Daltons.

Non-exclusive examples of suitable diisocyanates are hexamethylene diisocyanate (HDI), trimethyl hexamethylene diisocyanate, bis(4-isocyanatocyclohexyl)methane (H12MDI), isophorone diisoycanate (IPDI), tetramethylxylene diisocyanate (TMXDI), trimethylhexamethylene diisocyanate (TMDI), toluene diisocyanate (TDI). Non-exclusive examples of suitable capping agents are: 2-hydroxyethyl acrylate, 2-hydroxyethyl methacrylate, hydroxypropyl acrylate, hydroxypropyl methacrylate, 4-hydroxybutyl acrylate, 4-hydroxybutyl methacrylate. N-(2-Hydroxypropyl)methacrylamide and pentaerythritol triacrylate. Optionally chain extender diols may be used to increase molecular weight of polyurethane (meth)acrylate. Non-exclusive examples of chain extenders, but are not limited to, are ethylene glycol, propylene glycol, 1,3-propanediol, 1,3-butanediol, 1,4-butanediol, 1,5-pentanediol, 1,6 hexanediol, neopentyl glycol, 2-methyl-1,3-pentanediol, 1-methyl-1,5-pentanediol, 2-methyl-1,5-pentanediol and 3-methyl-1,5-pentanediol or combinations thereof. Optionally a catalyst may be used to make polyurethane (meth)acrylate. Examples of suitable catalysts, but are not limited to, are: tin catalysts such as; dibutyltin dilaurade, stannous octoate, dibutyltin diacetate, bismuth catalysts, zinc octoate.

Synthetic Procedure:

A suggested reaction of urethane (meth)acrylate oligomer is as follows. Polyol of OH-functionality 2 or 3, is blended with an excess of polyisocyanate of NCO-functionality 2 or 3 in the equivalent weight ratio of isocyanate to polyol between 1.5-2.5 to 1.0. A reaction vessel with polyol and polyisocyanate is themostatted at a temperature of from about 20° C. to about 100° C., or, preferably from about 30° C. to about 80° C., or more preferably from about 60° C. to about 70° C. A catalyst may be added in the concentrations of from about 10 to about 1000 ppm, or, preferably from about 20 to about 700 ppm, or more preferably from about 50 to about 100 ppm. Typical reaction time is 65° C. with a concentration of catalyst 100 ppm is from about 3 to about 4 hours. An increase (decrease) of the temperature leads to acceleration (deceleration) of a reaction of urethane prepolymer formation. Upon completion of a reaction indicated by termination of disappearance of NCO characteristic absorption in the IR spectrum, a capping agent, that is a hydroxyl substituted acrylate or methacrylate is added to the mixture which has residual non-reacted NCO. Upon completion of a capping reaction indicated by complete disappearance of NCO characteristic absorption in the IR spectrum the final urethane (meth)acrylate is formed. Typical reaction time at 65° C. with a concentration of catalyst 100 ppm is from about 8 to about 10 hours. A concentration of a capping agent is selected the way that a number of OH-equivalents of the capping agent is equal to a number of residual non-reacted NCO.

The liquid maskant composition is formed by mixing the ingredient components. Suitable examples of the reactive, i.e. polymerizable diluent may be any substituted vinyl monomer with one or more functional groups. Such materials as 2-hydroxyethyl (meth)acrylate, isobornyl (meth)acrylate, n-vinyl caprolactam, n,n-dimethyl acrylamide, and materials of similar compositions that are known to those skilled in the art and mixtures thereof. The photoinitiator is of any class of free radical photoinitiators, including Norrish Type I and Type II photoinitiators. Examples of suitable Type I homolytic free-radical photoinitiators are benzoin derivatives, methylolbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, halogenated acetophenone derivatives, and the like. Examples of suitable Type-II (hydrogen abstraction) photoinitiators are aromatic ketones such as benzophenone, xanthone, derivatives of benzophenone (e.g. chlorobenzophenone), blends of benzophenone and benzophenone derivatives (e.g. Photocure 81, a 50/50 blend of 4-methylbenzophenone and benzophenone), Michler's Ketone, Ethyl Michler's Ketone, thioxanthone and other xanthone derivatives like Quantacure ITX (isopropyl thioxanthone), benzil, anthraquinones (e.g. 2-ethyl anthraquinone), coumarin, and the like. Chemical derivatives and combinations thereof may also be used.

The thickening agent may be of any thixotrope known to those who are skilled in the art. These include, but are not limited to, untreated fumed silica, surface modified fumed silica, polyamide thixatropes, and mixed mineral thixotropes. The maskant composition may also include additional additives, such as heat stabilizers, UV-light stabilizers, free-radical scavengers (e.g., hindered amine light stabilizer compounds), dyes, pigments, surfactants, plasticizers, opacity-modifying agents, and combinations thereof.

The composition may also contain additional ingredients, that is overall liquid maskant composition includes the urethane (meth)acrylate oligomer, a polymerizable diluent, a photoinitiator, an optional thickening agent, and optional other additives. In the overall liquid maskant composition the urethane (meth)acrylate oligomer is usually present in an amount of from about 15% by weight to about 85% by weight, preferably from about 30% by weight to about 70% by weight, and more preferably from about 40% by weight to about 60% by weight. In the overall liquid maskant composition the reactive diluent is usually present in an amount of from about 20% by weight to about 60% by weight, preferably from about 20% by weight to about 50% by weight, and more preferably from about 25% by weight to about 40% by weight. In the overall liquid maskant composition the photoinitiator is usually present in an amount of from about 1% by weight to about 10% by weight, preferably from about 2% by weight to about 7% by weight, and more preferably from about 3% by weight to about 5% by weight. In the overall liquid maskant composition the thickener may be present in an amount of from 0% by weight to about 15% by weight, preferably from about 2% by weight to about 10% by weight, and more preferably from about 2% by weight to about 6% by weight. In the overall liquid maskant composition the optional additional additives may be present in an amount of from about 0% by weight to about 5% by weight, preferably from about 0.01% by weight to about 4% by weight, and more preferably from about 0.05% by weight to about 3% by weight.

In use, the liquid maskant composition is applying the maskant composition onto a surface of a substrate, such as a metal substrate. The liquid maskant composition is then cured by exposing to sufficient actinic radiation to polymerize or crosslink the composition into a dried maskant. Polymerization may be initiated by exposure to ultraviolet and/or visible light. The length of time for exposure is easily determined by those skilled in the art and depends on the selection of the particular components of the radiation curable composition. Typically exposure ranges from about 0.2 second to about 120 seconds, preferably from about 0.5 seconds to about 60 seconds, and more preferably from about 0.5 seconds to about 30 seconds. Typical exposure intensities range from about 5 mW/cm$^2$ to about 2500 mW/cm$^2$, preferably from about 50 mW/cm$^2$ to about 1500 mW/cm$^2$, and more preferably from about 100 mW/cm$^2$ to about 1000 mW/cm$^2$.

In one embodiment, the liquid maskant composition is applied to a substrate surface at a thickness of from about 0.005 inch to about 0.060 inch. In another embodiment the film thickness has a thickness of from about 0.005 inch to about 0.040 inch. The masked substrate may then by used in typical applications, for example in the production of aircraft parts, medical orthopedics, automotive parts, agricultural parts, or the like, which may require protecting the substrate surface from heating conditions at a temperature of from about 400° F. to about 600° F. for a duration of from about 20 minutes to about 30 minutes. After the processing of the metal surface, the maskant can be removed from the metal surface by peeling or by burning off. The burn off process can be in the range of 500° F. to 1,200° F. for a period of time of a few minutes to several hours, leaving essentially no residue.

The following non-limiting examples serve to illustrate the invention.

EXAMPLES

Test Methods

Tensile Test

Samples of the dimensions of films cured under a metal halide lamp at 250 mW/cm$^2$ for 30 sec in a Teflon mold 3"(76 mm) long, 0.75"(19 mm) wide and 0.04"(1 mm) deep. Samples were then placed in an oven at 500° F. (260° C.) for 20 minutes, removed and allowed to cool to room temperature. Heat treated and non-heat treated samples were then pulled on an Instron Model 4467 on a 200 lb load cell at a speed of 1"/min. Tensile at break (psi), elongation at break and Young's modulus (psi) were recorded.

Peel Test

Samples were prepared by casting 0.04"(1 mm) thick and 0.87"(22 mm) wide maskants onto a nickel alloy substrate and curing for 30 seconds under a metal halide lamp at 250 mW/cm$^2$. Samples were then placed in an oven at 500° F. (260° C.) for 20 minutes, removed and allowed to cool to room temperature. Heat treated and non-heat treated samples were then pulled at 90° using a Thwing-Albert peel tester (Model FP-2255 with a 10 kg load cell) at a speed of 20 mm/sec. Max peel strength (grams) and peel distance (mm) before break recorded.

The following inventive Example compositions A and B, and comparative Example compositions C, D and E were formed, where the ingredients are in parts by weight.

| Sample Composition | A | B | C | D | E |
|---|---|---|---|---|---|
| Isobornyl Acrylate | 28 | 28 | 28 | 28 | 28 |
| 4-Hydroxybutyl Acrylate | 15 | 15 | 15 | 15 | 15 |
| Irgacure 4265 | 3 | 3 | 3 | 3 | 3 |
| Polycarbonate Urethane Acrylate Oligomer | 54 | — | — | — | — |
| Polycarbonate caprolactone Urethane Acrylate Oligomer | — | 54 | — | — | — |
| Polyester Urethane Acrylate Oligomer | — | — | 54 | — | — |
| Polyether Urethane Acrylate Oligomer | — | — | — | 54 | — |
| Polybutadiene Urethane Acrylate Oligomer | — | — | — | — | 54 |

*Irgacure 4265 obtained from BASF

The inventive polycarbonate and polycarbonate caprolactone urethane acrylate oligomers are of the composition described above. The polyester, polyether and polybutadiene are Bomar™ BR-403, BR-543 and BR-641, respectively, available from Dymax Oligomer and Coatings. Each sample was prepared by blending components until mixture was homogenous. The following conditions and results are noted.

Sample B—Polycarbonate Caprolactone (Invention):

Similar to the results of Sample A, the polycarbonate caprolactone oligomer retains enough tensile strength (466 psi) and elongation (62%) to be peeled off from the substrate after heating, even though adhesion to the substrate has increased but the higher cohesive strength (3511 psi) still makes the film peelable.

Sample C—Polyester (Comparative):

The polyester oligomer composition shows a reduction of tensile strength which is 227 psi and it not enough to withstand while being stretched. In addition, the lower modulus of 599 is an indication of weak cohesive strength. As a result the film breaks readily when attempted to be removed.

Sample D—Polyether (Comparative):

The polyether oligomer composition has weak tensile (128 psi) and lower flexibility (12%) which makes it easily breakable during peeling the film.

Sample E—Polybutadiene (Comparative):

Similar to the polyether oligomer composition, the polybutadiene oligomer composition substantially loses elongation (8%) and along with increases in modulus, consequently makes it very brittle. For this reason, the film cannot be bent 90° without breaking and could not be tested using the peel tester.

| | A - Polycarbonate | | | B - Polycarbonate Caprolactone | | | C - Polyester | | |
|---|---|---|---|---|---|---|---|---|---|
| | Preheat | Post Heat | Change | Preheat | Post Heat | Change | Preheat | Post Heat | Change |
| Tensile Results | | | | | | | | | |
| Tensile at Break (psi) | 473.5 | 646 | 36.4% | 347 | 466 | 34.3% | 386 | 227 | −41.2% |
| Elongation at Break | 164% | 43% | −73.8% | 109% | 62% | −42.9% | 189% | 46% | −75.7% |
| Young's Modulus (psi) | 702 | 7794 | 1010.3% | 633.5 | 1871 | 195.3% | 563 | 599 | 6.4% |
| Peel Test | | | | | | | | | |
| Peel Strength (lb/in) | 6.5 | 12.7 | 95.4% | 4.7 | 8.9 | 89.4% | 2.5 | 2.5 | 0.0% |
| Peel Distance (in) | 1.00 | 0.71 | −29.0% | 1.00 | 0.94 | −8.0% | 1.00 | 0.24 | −76.0% |

| | D - Polyether | | | E - Polybutadiene | | |
|---|---|---|---|---|---|---|
| | Preheat | Post Heat | Change | Preheat | Post Heat | Change |
| Tensile Results | | | | | | |
| Tensile at Break (psi) | 150 | 128 | −14.7% | 225 | 498 | 121.3% |
| Elongation at Break | 71% | 12% | −83.5% | 163% | 8% | −95.1% |
| Young's Modulus (psi) | 226 | 8420 | 3625.7% | 437.5 | 9894 | 2161.5% |
| Peel Test | | | | | | |
| Peel Strength (lb/in) | 2.4 | 3.9 | 62.5% | 5.1 | — | N/A |
| Peel Distance (in) | 1.00 | 0.35 | −65.0% | 1.00 | — | N/A |

Sample A—Polycarbonate (Invention):

Tensile increase coincides with an increase in modulus. Flexibility is decreased, but the final value allows the film to remain flexible for the purpose of peeling. The tensile value 646 psi is an indication that the film can withstand while being stretched or pulled before breaking. The film has enough tensile strength and flexibility of 43% to be peeled off the substrate after heating. Even though the adhesion to the substrate has increased, the cohesive strength is higher than the adhesive strength and as a result it is easily pulled off. The high modulus of 7794 psi is an indication of good cohesive strength. There must to be a good balance of all three parameters namely tensile, elongation and young's modulus for it to be peelable after heating.

Summary:

The polycarbonate and polycarbonate caprolactone oligomers impart enough heat resistance to allow the maskant composition to survive high temperatures for an extended period of time without breaking down. Afterwards, the resultant films can be removed through peeling. Alternatively, the films could be removed by burning them off at temperatures greater than 600° F. without leaving any residue as found by TGA analysis (See FIG. 1). Typical urethane acrylate chemistries of polyester, polyether and polybutadiene lack the ability to retain suitable tensile properties to survive high temperatures seen by substrates during a plasma spray treatment. Furthermore, films using polycarbonate and polycarbonate caprolactone oligomers can also be flexible enough to survive grit/shot blasting processing in addition to having good heat resistance. These maskant formulations can be applied and cured quickly, saving several hours that would otherwise be spent taping, while still providing the necessary protection of the metal surface. FIG. 1 shows a weight change of Samples A and B heated to 1,000° C. using TGA.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for shielding a metal substrate surface during the application of heat to the surroundings of the substrate which comprises:
   I) providing a liquid maskant composition which comprises:
   a) at least one of a polycarbonate caprolactone urethane diacrylate oligomer, or a polycarbonate caprolactone urethane dimethacrylate oligomer;
   wherein the polycarbonate caprolactone urethane diacrylate oligomer or polycarbonate caprolactone urethane dimethacrylate oligomer has a formula:

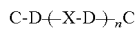

wherein:
   n=1-30
   D=a diisocyanate residue
   C=a residue of a hydroxy functional methacrylate or hydroxy functional acrylate capping agent
   Y=a residue of a polycarbonate caprolactone diol with formula

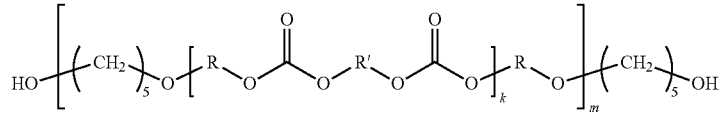

k=1-30
   m=1-20
   R=$C_2$ to $C_8$ alkyl group;
   R'=$C_2$ to $C_8$ alkyl group;
   b) a reactive diluent capable of free radical polymerization;
   c) a photoinitiator capable of generating free radicals when exposed to actinic radiation;
   II) applying the liquid maskant composition onto a surface of the substrate;
   III) exposing said liquid maskant composition to sufficient actinic radiation to polymerize or crosslink the composition into a dried maskant.

2. The method of claim 1 wherein the liquid maskant composition comprises the polycarbonate caprolactone urethane diacrylate oligomer.

3. The method of claim 1 wherein the liquid maskant composition comprises the polycarbonate caprolactone urethane dimethacrylate oligomer.

4. The method of claim 1 wherein the liquid maskant composition comprises from about 15 to about 85% of the polycarbonate caprolactone urethane diacrylate oligomer, or polycarbonate caprolactone urethane dimethacrylate oligomer.

5. The method of claim 1 wherein the liquid maskant composition comprises from about 20% by weight to about 50% by weight of the reactive diluent capable of free radical polymerization.

6. The method of claim 1 wherein the liquid maskant composition comprises from about 1% by weight to about 10% by weight of the photoinitiator.

7. The method of claim 1 wherein the liquid maskant composition further comprises up to about 15% by weight of a thickening agent.

8. The method of claim 1 wherein the liquid maskant composition further comprises up to about 5% by weight of one or more of heat stabilizers, UV-light stabilizers, free-radical scavengers, hindered amine light stabilizer compounds, dyes, pigments, surfactants, plasticizers, opacity-modifying agents, and combinations thereof.

9. The method of claim 1 wherein the reactive diluent capable of free radical polymerization comprises a vinyl containing monomer.

10. The method of claim 1 wherein the maskant composition is applied at a thickness of from about 0.005 inch to about 0.060 inch.

11. The method of claim 1 further comprising the subsequent step IV) of heating the substrate to a temperature of from about 400° F. to about 600° F. for from about 20 minutes to about 30 minutes.

12. The method of claim 11 further comprising the subsequent step V) of removing the dried maskant.

13. The method of claim 12 wherein the step V) of removing the dried maskant is conducted by peeling the dried maskant from the surface of the substrate.

14. The method of claim 12 wherein the step V) of removing the dried maskant is conducted by burning the dried maskant from the surface of the substrate.

15. A liquid maskant composition which comprises
   a) a polycarbonate caprolactone urethane diacrylate oligomer or polycarbonate caprolactone urethane dimethacrylate oligomer a having the formula:

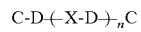

wherein:
   n=1-30
   D=a diisocyanate residue
   C=a residue of a hydroxy functional methacrylate or hydroxy functional acrylate capping agent
   Y=a residue of a polycarbonate caprolactone diol with formula

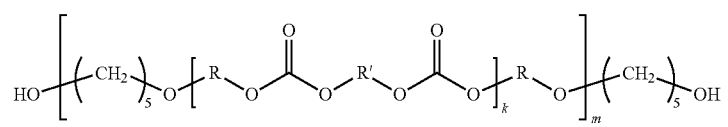

k=1-30
m=1-20
R=C$_2$ to C$_8$ alkyl group;
R'=C$_2$ to C$_8$ alkyl group;

b) a reactive diluent capable of free radical polymerization; and c) a photoinitiator capable of generating free radicals when exposed to actinic radiation.

16. The liquid maskant composition of claim 15 comprising the polycarbonate caprolactone urethane diacrylate oligomer.

17. The liquid maskant composition of claim 15 comprising the polycarbonate caprolactone urethane dimethacrylate oligomer.

* * * * *